(12) United States Patent
Li et al.

(10) Patent No.: US 9,913,285 B2
(45) Date of Patent: Mar. 6, 2018

(54) SRS SIGNALING PATTERN FOR D2D CHANNEL MEASUREMENTS

(71) Applicant: QUALCOMM Incorporated, San Diego, CA (US)

(72) Inventors: Qiao Li, Hillsborough, NJ (US); Saurabha Rangrao Tavildar, Jersey City, NJ (US); Bilal Sadiq, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 14/187,189

(22) Filed: Feb. 21, 2014

(65) Prior Publication Data

US 2015/0245375 A1    Aug. 27, 2015

(51) Int. Cl.
H04W 72/12 (2009.01)
*H04L 5/00* (2006.01)
H04W 76/02 (2009.01)

(52) U.S. Cl.
CPC ....... *H04W 72/1263* (2013.01); *H04L 5/0048* (2013.01); *H04L 5/0051* (2013.01); *H04W 76/023* (2013.01)

(58) Field of Classification Search
None
See application file for complete search history.

(56) References Cited

U.S. PATENT DOCUMENTS

2014/0036809 A1  2/2014 Xu et al.
2014/0334435 A1* 11/2014 Al-Shalash ........... H04W 8/005
                                                      370/330

OTHER PUBLICATIONS

CATT: "Details of discovery signal design", 3GPP Draft; R1-134115, 3rd Generation Partnership Project 3GPP), Mobile Competence Centre; 650, Route Des Lucioles; F-06921 Sophia-Antipolis Cedex; France, vol. RAN WG1, No. Guangzhou, China; Sep. 28, 2013.
International Search Report and Written Opinion—PCT/US2015/016198—ISA/EPO—Jun. 10, 2015.
Subramanian V et al., "Enabling Data Offload and Proximity Services Using Device to Device Communication over Licensed Cellular Spectrum with Infrastructure Control", 2013 IEEE 78th Vehicular Technology Conference (VTC Fall), IEEE, pp. 1-7, Sep. 2, 2013.
Wen Si et al., "QoS-aware mode selection and resource allocation scheme for Device-to-Device (D2D) communication in cellular networks", 2013 IEEE International Conference on Communications Workshops (ICC), IEEE, pp. 101-105,Jun. 9, 2013.

* cited by examiner

*Primary Examiner* — Christopher Crutchfield
*Assistant Examiner* — Alan Lindenbaum
(74) *Attorney, Agent, or Firm* — Arent Fox LLP

(57) ABSTRACT

A method, an apparatus, and a computer program product for wireless communication are provided. The apparatus configures a number of channel measurement periods for an n number of user equipments (UEs), determines a number of subsets of the n UEs based on a pattern, and schedules each of the number of subsets of the n UEs for transmission of a signal during a different one of the number of channel measurement periods.

27 Claims, 16 Drawing Sheets

| srs-SubframeConfig | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0,1} |
| 8 | 1000 | 5 | {2,3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0,1,2,3,4,6,8} |
| 14 | 1110 | 10 | {0,1,2,3,4,5,6,8} |
| 15 | 1111 | reserved | reserved |

| SRS Configuration Index $I_{SRS}$ | SRS Periodicity $T_{SRS}$ (ms) | SRS Subframe Offset $T_{offset}$ |
|---|---|---|
| 0 – 1 | 2 | $I_{SRS}$ |
| 2 – 6 | 5 | $I_{SRS} - 2$ |
| 7 – 16 | 10 | $I_{SRS} - 7$ |
| 17 – 36 | 20 | $I_{SRS} - 17$ |
| 37 – 76 | 40 | $I_{SRS} - 37$ |
| 77 – 156 | 80 | $I_{SRS} - 77$ |
| 157 – 316 | 160 | $I_{SRS} - 157$ |
| 317 – 636 | 320 | $I_{SRS} - 317$ |
| 637 – 1023 | reserved | reserved |

FIG. 10

$m_{SRS,b}$ and $N_b, b = 0,1,2,3$, values for the uplink bandwidth of $40 < N_{RB}^{UL} \leq 60$.

| SRS bandwidth configuration $C_{SRS}$ | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

FIG. 11

SRS SIGNALING PATTERN FOR D2D CHANNEL MEASUREMENTS

BACKGROUND

Field

The present disclosure relates generally to communication systems, and more particularly, to an sounding reference signal (SRS) signaling pattern for device-to-device (D2D) channel measurements.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus configures a number of channel measurement periods for an n number of user equipments (UEs), determines a number of subsets of the n UEs based on a pattern, and schedules each of the number of subsets of the n UEs for transmission of a signal during a different one of the number of channel measurement periods.

BRIEF DESCRIPTION OF THE DRAWINGS

FIG. 9 is a diagram illustrating a frame structure of SRS subframe configurations in accordance with the various aspects of the present disclosure.

FIG. 10 is a diagram illustrating UE specific SRS configurations in accordance with the various aspects of the present disclosure.

FIG. 11 is a diagram illustrating an SRS bandwidth configuration in accordance with the various aspects of the present disclosure.

DETAILED DESCRIPTION

Figure 1:
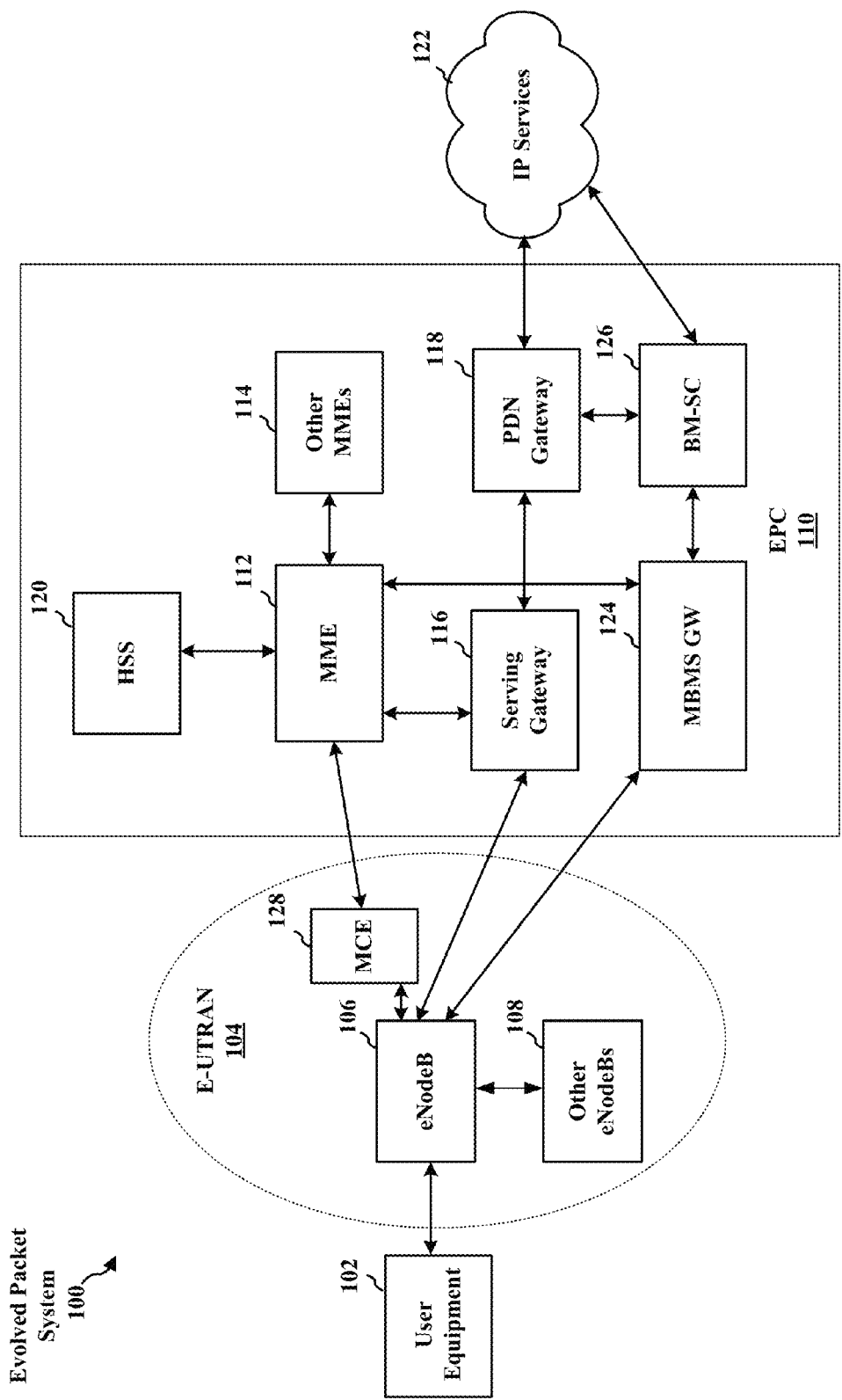
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
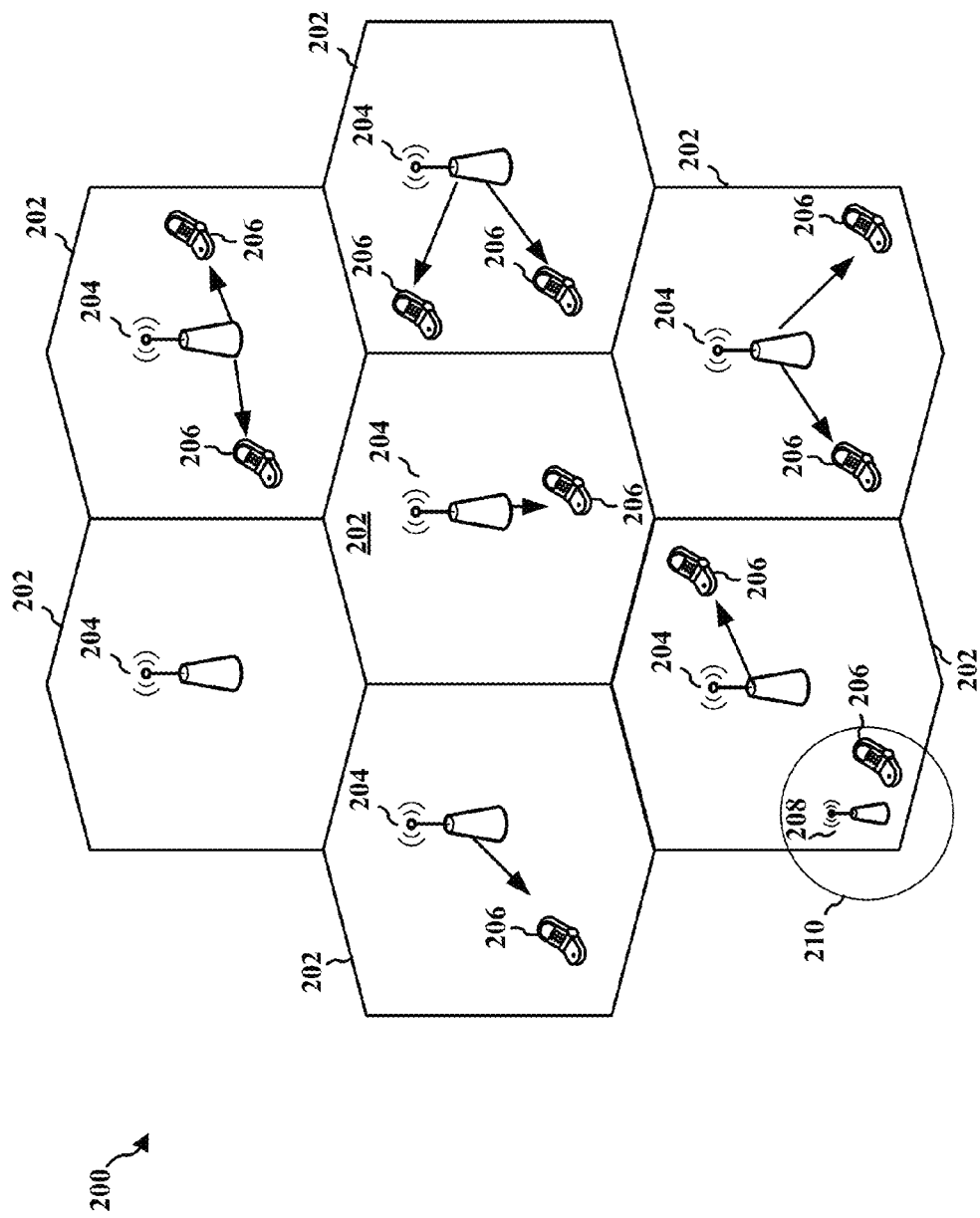
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
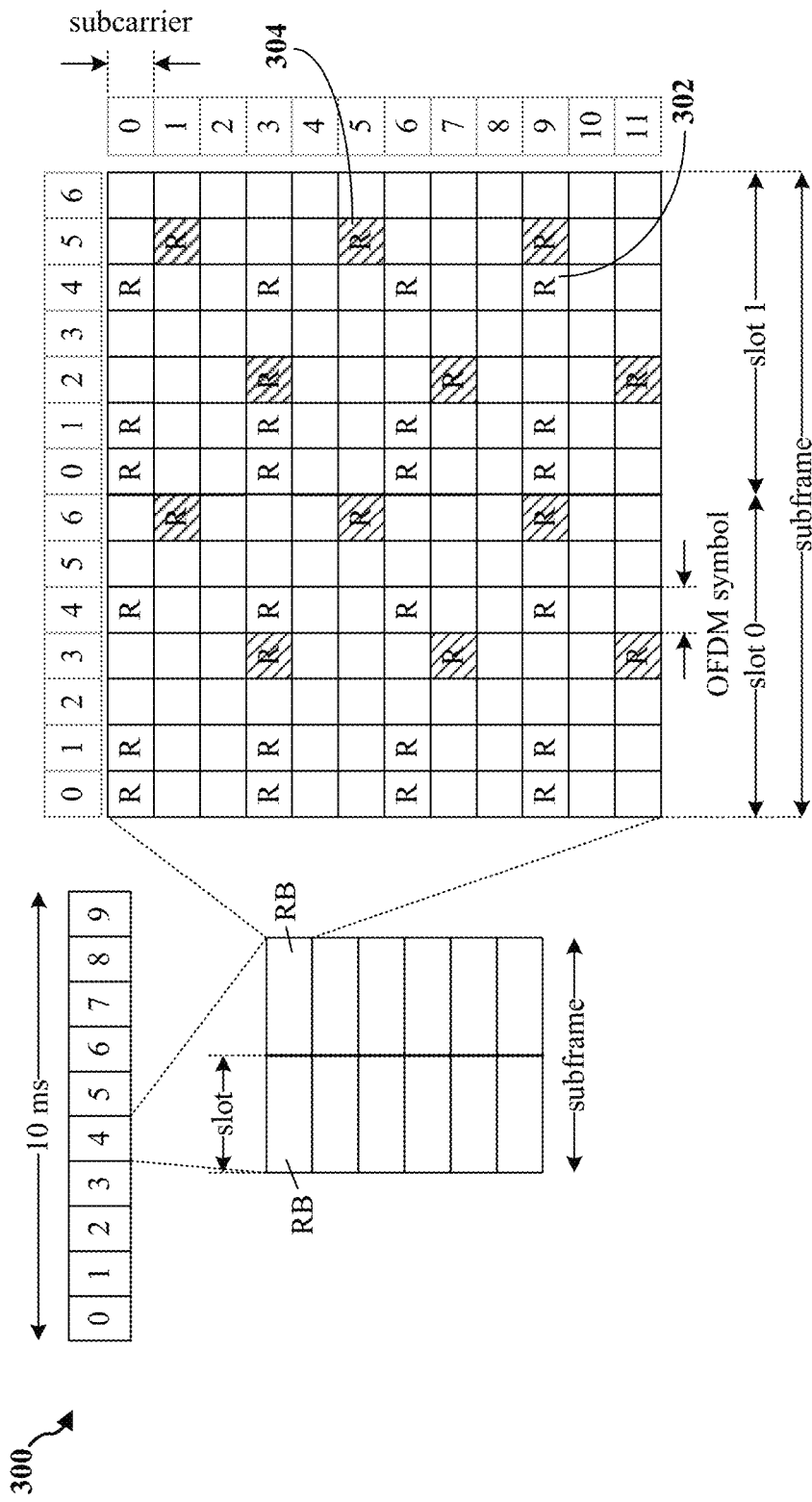
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
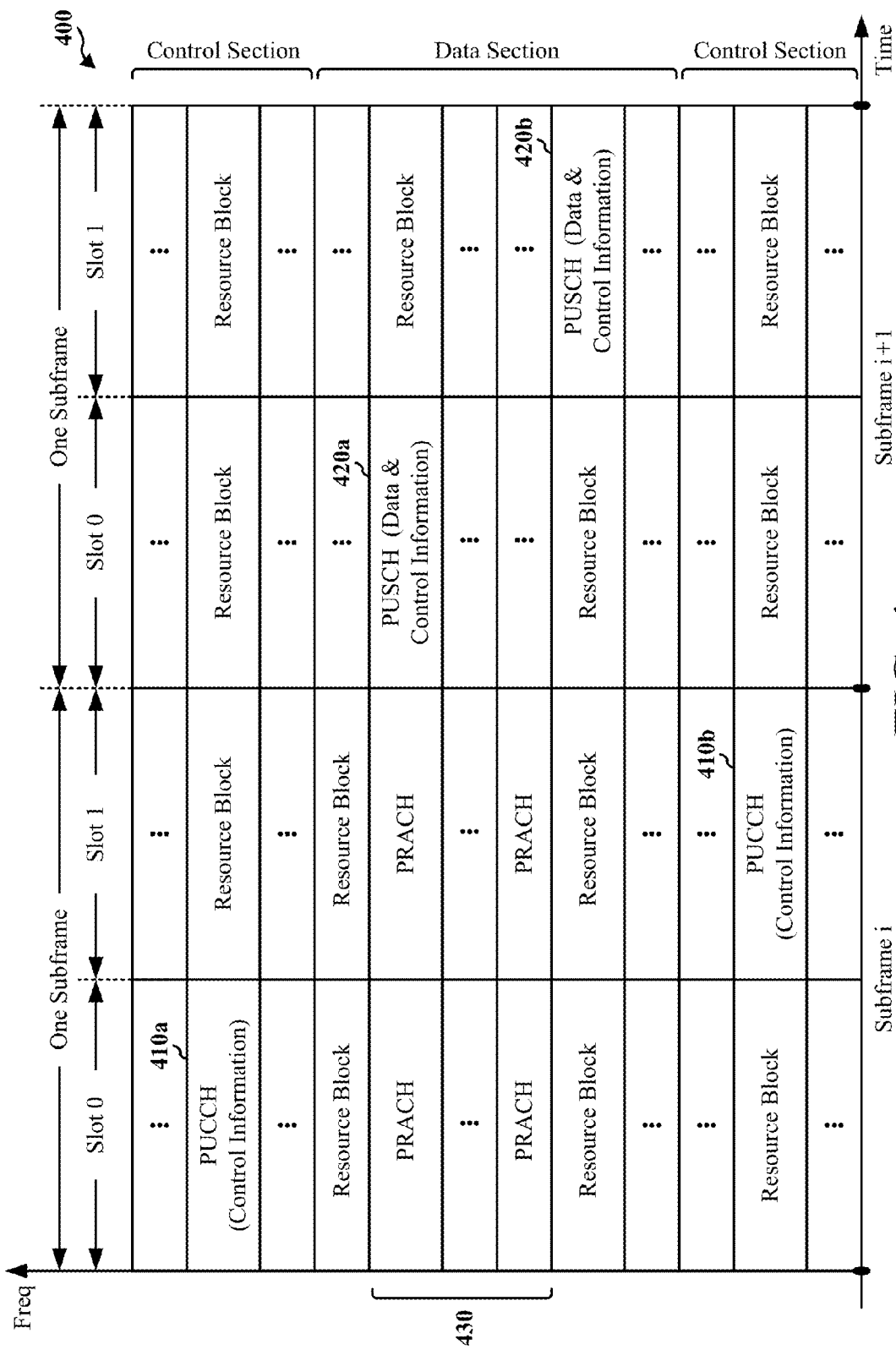
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
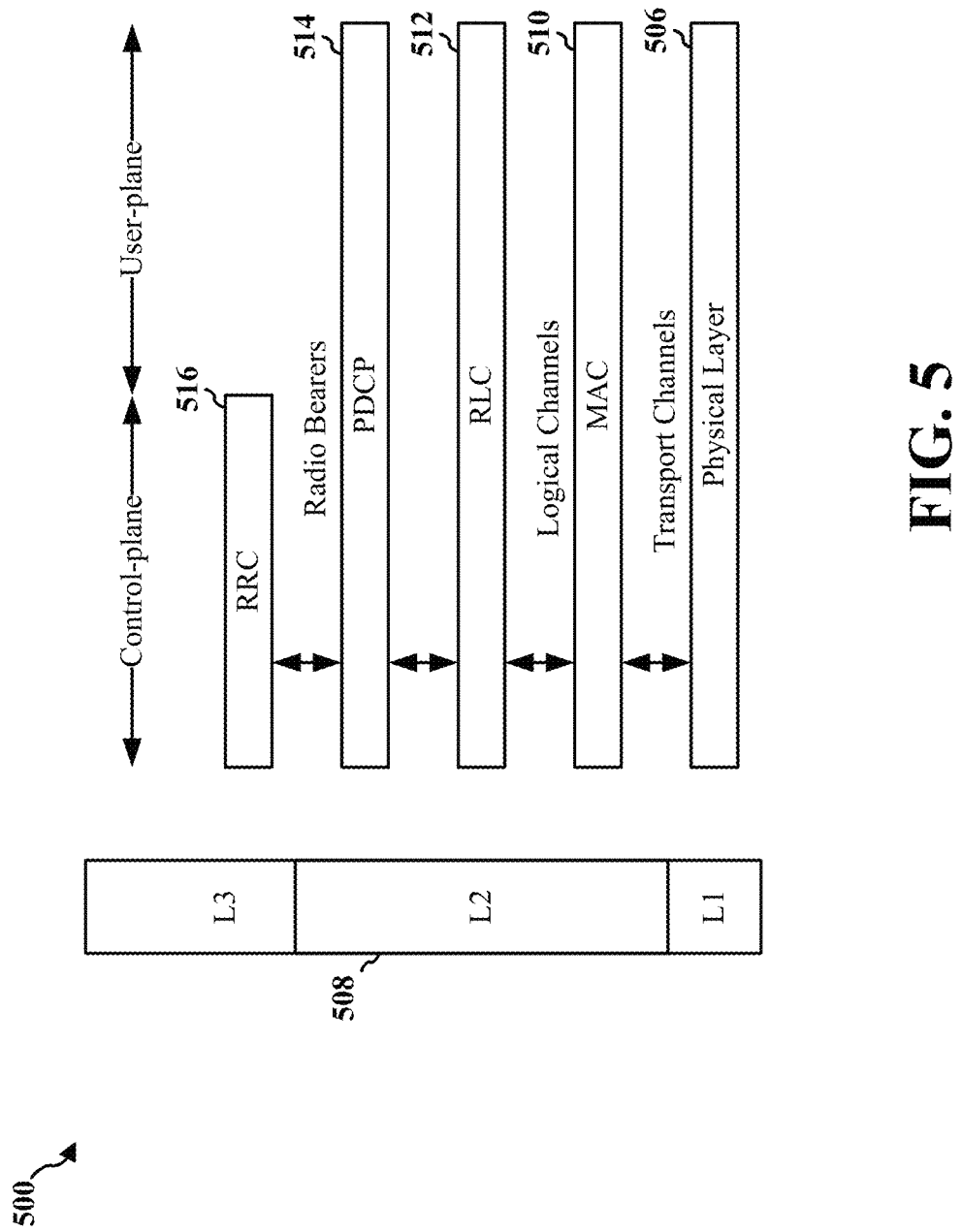
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
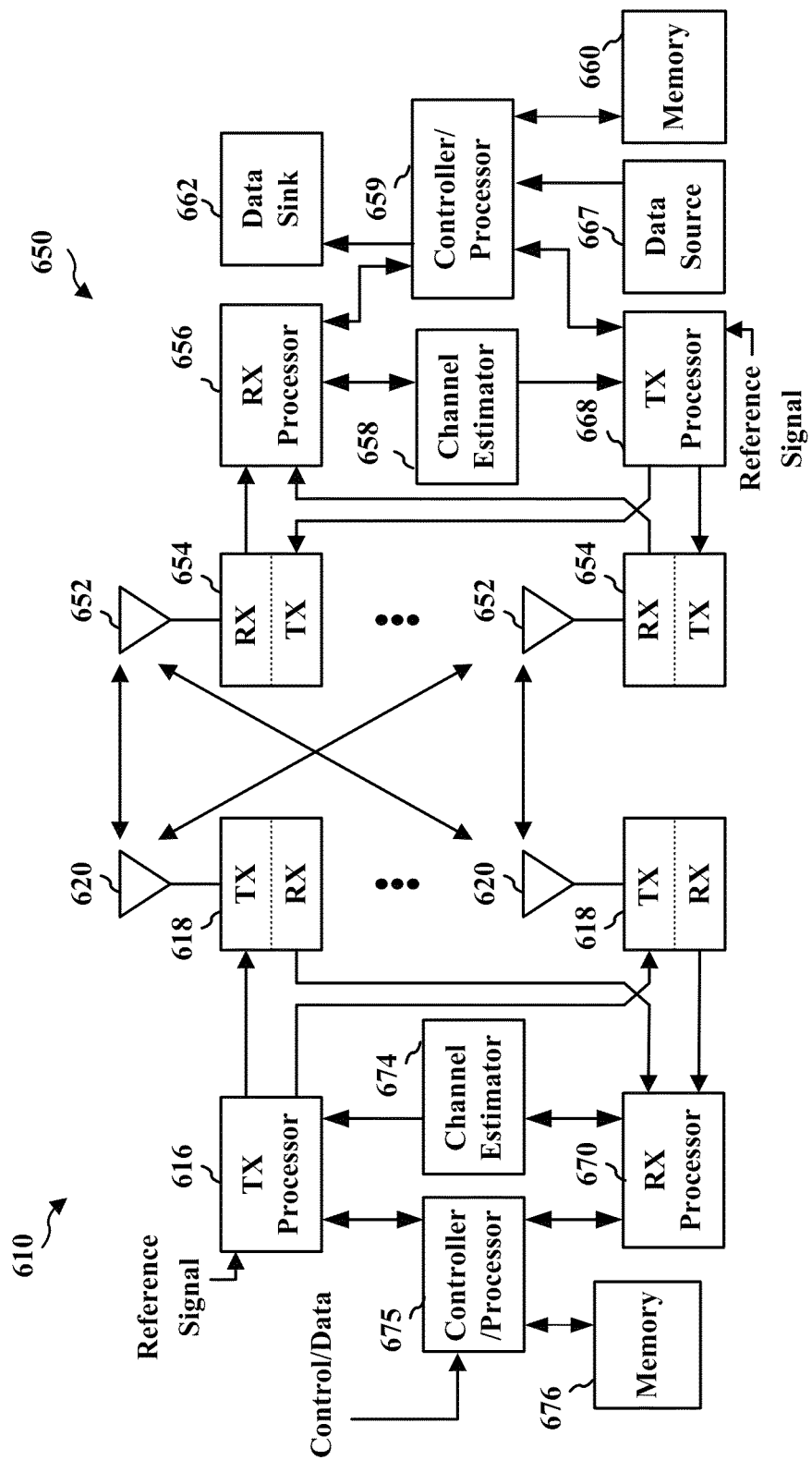
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
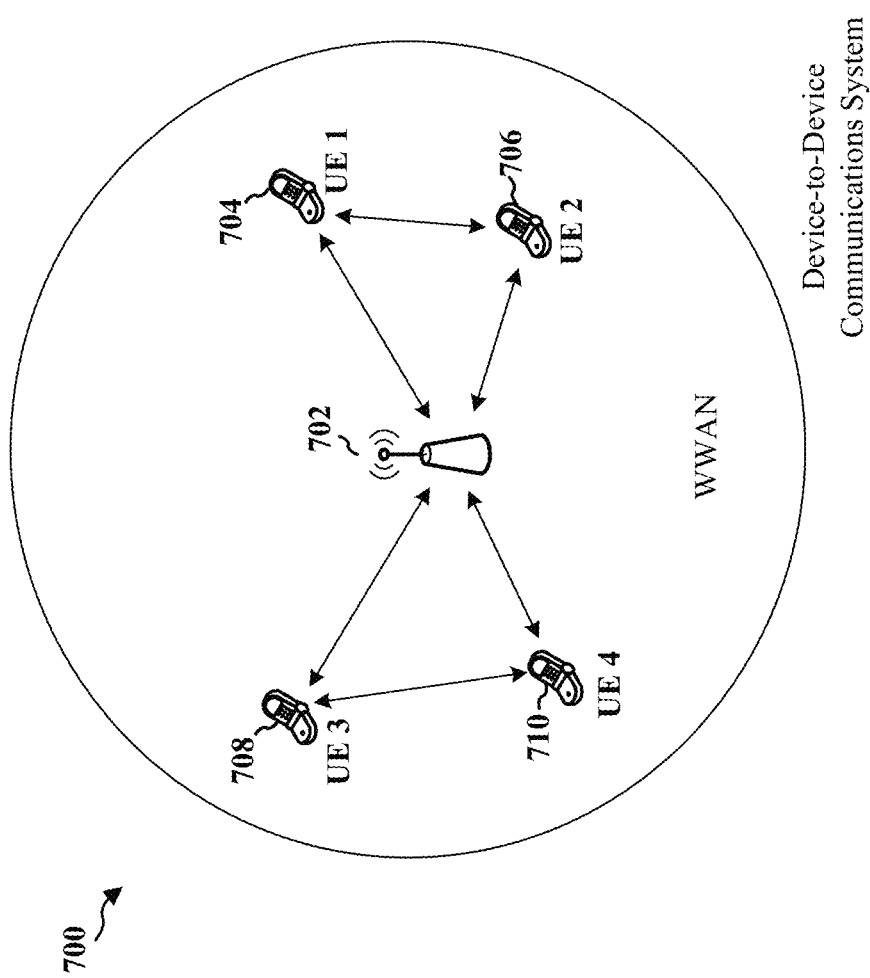
FIG. 7 is a diagram of a D2D communications system in accordance with the various aspects of the present disclosure.

FIG. 7 is a diagram of a D2D communications system 700. The D2D communications system 700 includes a number of UEs, such as UEs 704, 706, 708, and 710. The D2D communications system 700 may overlap with a cellular communications system, such as a wireless wide area network (WWAN). Some of the UEs 704, 706, 708, 710 may communicate together in D2D communication using the DL/UL WWAN spectrum, some may communicate with the base station 702, and some may do both. For example, as shown in FIG. 7, the UEs 708, 710 are in D2D communication and the UEs 704, 706 are in D2D communication. In the configuration of FIG. 7, UEs 704, 706 and the UEs 708, 710 are also communicating with the base station 702.

The exemplary methods and apparatuses discussed infra are applicable to any of a variety of wireless D2D communications systems, such as a wireless D2D communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless D2D communication systems.

In an aspect, UEs 704, 706, 708, and/or 710 in the D2D communications system 700 may measure the D2D channel gain matrix for D2D communication and may report information regarding the D2D channel gain matrix to the base station 702 (also herein referred to as an eNB). In an aspect, the D2D channel gain matrix may be used by the base station 702 for network assisted D2D communications. In network assisted D2D communications, for example, the base station 702 may allocate at least a portion of the DL/UL WWAN spectrum for use by D2D pairs (e.g., UEs 704, 706 and/or UEs 708, 710) for D2D communication. In an aspect, signals (e.g., reference signals, such as SRSs) may be transmitted by one or more of the UEs in the D2D communications system 700 for estimation of the D2D channel gain matrix.

In an aspect, in order to estimate the D2D channel gain matrix, every UE may need to receive the reference signal transmissions from every other interfering UE. For example, a first UE may be considered to be an interfering UE when a signal (e.g., a reference signal, such as an SRS signal) transmitted from the first UE is received at a second UE, such that the power of the reference signal received at the second UE exceeds a threshold or the path loss between first and second UEs is less than a threshold. In an aspect, the UEs in the D2D communications system 700 may be operating in a half-duplex mode, such that a UE transmitting one signal cannot simultaneously receive another signal.

In an aspect, the base station 702 may configure a number of channel measurement periods (also referred to as D2D channel measurement periods) for an n number of UEs. The n number of UEs may include some or all of the UEs located in a cell served by the base station 702. For example, with reference to FIG. 7, the n number of UEs may include UEs 704, 706, 708, and 710, in which case n=4. It should be understood that the n number of UEs may include a greater or lesser number of UEs in other examples. In each channel measurement period, a subset of the n number of UEs may be configured to transmit signals (e.g., reference signals, such as SRSs) while UEs not included in the subset may be configured to receive the signals. An example of the channel measurement periods configured by the base station 702 is discussed infra with respect to FIG. 8.

Figure 8:
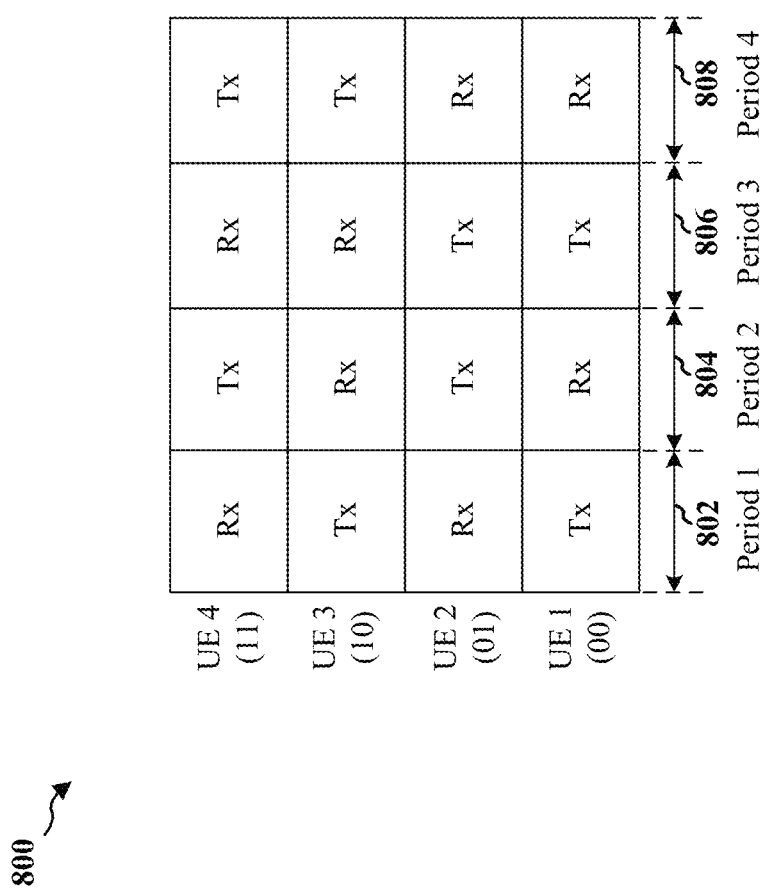
FIG. 8 is a diagram illustrating a D2D channel measurement schedule in accordance with the various aspects of the present disclosure.

FIG. 8 is a diagram illustrating a D2D channel measurement schedule 800 in accordance with the various aspects of the present disclosure. In an aspect, the base station 702 may configure 2 $\lceil \log_2 n \rceil$ D2D channel measurement periods for the n number of UEs in the cell covered by the base station 702. For example, in the configuration of FIG. 7 that includes four UEs (e.g., n=4), the base station 702 may configure four (e.g., 2 $\lceil \log_2 4 \rceil$=4) D2D channel measurement periods, such as period 1 802, period 2 804, period 3 806, and period 4 808 shown in FIG. 8. For example, each of the D2D measurement periods 802, 804, 806, and 808 may have the duration of an OFDM symbol of an LTE subframe or other suitable duration. In one example, periods 802, 804, 806, and 808 may each be approximately 66.7 μs.

In an aspect, the base station 702 may assign a unique identification value to each of the n UEs. For example, as shown in FIG. 8, UE 1 704 may be assigned a binary identification value '00', UE 2 706 may be assigned a binary identification value '01', UE 3 708 may be assigned a binary identification value '10', and UE 4 710 may be assigned a binary identification value '11'.

In an aspect, the base station 702 may determine a number of subsets of the n UEs based on a pattern, where each subset of the n UEs may be configured to transmit during a different one of the D2D channel measurement periods. In an aspect, each subset may include less than or equal to n/2 UEs. In an aspect, the pattern may indicate one or more of the n UEs to be included in each of the number of subsets based on the identification values of the n UEs. In such aspect, a subset of the n UEs may be determined according to the values of specific bits in the binary identification values. For example, if the $j^{th}$ (e.g., j=1, 2, . . . , $\lceil \log_2 n \rceil$) bit of a binary identification value of a UE is '0', such UE may be included in one subset, whereas if the $j^{th}$ bit of a binary identification value of a UE is '1', such UE may be included in another subset. In an aspect, the first bit (e.g., j=1) of a binary identification value may be the least significant bit of the binary identification value, the second bit (e.g., j=2) may be the bit next to the least significant bit of the binary identification value, and so on.

With reference to FIG. 8, for example, UEs whose first bit (e.g., j=1) of the binary identification value is '0' include UE 1 and UE 3, UEs whose first bit (e.g., j=1) of the binary identification value is '1' include UE 2 and UE 4, UEs whose second bit (e.g., j=2) of the binary identification value is '0' include UE 1 and UE 2, and UEs whose second bit (e.g., j=2) of the binary identification value is '1' include UE 3 and UE 4. Accordingly, UE 1 and UE 3 may be included in a first subset, UE 2 and UE 4 may be included in a second subset, UE 1 and UE 2 may be included in a third subset, and UE 3 and UE 4 may be included in a fourth subset.

In an aspect, the base station 702 may schedule each of the subsets of the n UEs for transmission of a signal (e.g., a reference signal, such as an SRS) during a different one of the number of D2D channel measurement periods. In an aspect, the base station 702 may schedule UEs whose $j^{th}$ bit of the binary identification value is '0' to transmit in D2D channel measurement period 2j−1, and may schedule UEs whose $j^{th}$ bit of the binary identification value is '1' to transmit in channel measurement period 2j. For example, with reference to FIG. 8, the base station 702 may schedule the first subset including UE 1 and UE 3 to transmit during period 1 802, the second subset including UE 2 and UE 4 to transmit during period 2 804, the third subset including UE 1 and UE 2 to transmit during period 3 806, and the fourth subset including UE 3 and UE 4 to transmit during period 4 808. It should be noted that the pattern used to generate the D2D channel measurement schedule 800 allows each UE to receive every other UE's transmission within $2\lceil \log_2 n \rceil$ D2D channel measurement periods. In an aspect, one or more of the n UEs, whether engaged in D2D or WAN communication, may have already been scheduled to transmit data in a resource (e.g., a symbol of a subframe) that overlaps with a D2D channel measurement resource (e.g., a D2D channel measurement period for transmitting an SRS). In such aspect, the one or more of the n UEs may yield data transmission during the conflicting D2D channel measurement period.

In an aspect, the base station 702 may allocate a resource from a number of available resources to each of the number of subsets of the n UEs for transmission of the signal during the D2D channel measurement periods (e.g., channel measurement periods 802, 804, 806, and/or 808). In such aspect, the number of concurrently available resources may be greater than or equal to n/2.

In an aspect, the base station 702 may send a configuration message for configuring one or more attributes of the signal to be transmitted by the subsets of the n UEs. For example, the attributes may include a comb, a cyclic shift, and/or a transmit power of an SRS. For example, the configuration message may be a broadcast message or an RRC message that may be sent to one or more of the n UEs.

In an aspect, the base station 702 may indicate, to one or more of the n UEs in the cell covered by the base station 702, the D2D channel measurement periods (e.g., subframes and/or symbols) during which other UEs are scheduled to transmit signals (e.g., reference signals, such as SRSs) for intracell D2D channel measurements. In an aspect, the base station 702 may indicate, to one or more UEs outside the cell covered by the base station 702, the D2D channel measurement periods (e.g., subframes and/or symbols) during which UEs in the cell covered by the base station 702 are scheduled to transmit signals (e.g., reference signals, such as SRSs) for intercell D2D channel measurements. In an aspect, the base station 702 may further indicate the attributes (e.g., comb, a cyclic shift, and/or a transmit power) of the signals to one or more of the n UEs in the cell covered by the base station and/or to one or more UEs outside the cell covered by the base station 702.

In an aspect, at least one of the n UEs may be configured to transmit a report that includes one or more D2D channel measurements based on signals (e.g., reference signals, such as SRSs) received from other UEs in the cell covered by the base station 702 and/or from other UEs outside the cell covered by the base station 702. In an aspect, the one or more D2D channel measurements may be prioritized based on channel strength. For example, D2D channels having the highest strengths may be listed first in the report. The base station 702 may receive the report from the at least one of the n UEs and may assign resources to one or more of the n UEs for D2D communications based on the report. In an aspect, the base station 702 may further receive measurements for a control channel, such as PUCCH, or a shared channel, such as PUSCH. In an aspect, the n UEs receiving the signals of other UEs during each D2D measurement period (e.g., measurement periods 802, 804, 806, and/or 808) may not need to know the IDs (e.g., the binary identification values) of the transmitting UEs. In such aspect, the at least one of the n UEs may report a D2D channel measurement for a particular subframe, symbol, cyclic shift, and/or comb combination. In an aspect, the at least one of the n UEs may report all measurements since the last report. In an aspect, the at least one of the n UEs may exclude from the report D2D channels having a strength that is below a threshold. For example, the threshold may be set by the base station 702 and communicated to the at least one of the n UEs.

It should be noted that in the aspects discussed supra, the n number of UEs in each cell is less than twice the total number of resources available for transmitting a signal (e.g., a reference signal, such as SRS) per D2D channel measurement period. Such a configuration allows n/2 concurrent transmissions by the n UEs in the cell covered by the base station 702. However, in an aspect, the cell covered by the base station 702 may include a k number of UEs, where k is greater than or equal to twice the total number of resources available for transmitting a signal (e.g., a reference signal, such as SRS) per D2D channel measurement period and where k>n. In such aspect, the base station 702 may partition the k number of UEs into one or more groups, where each group includes less than or equal to the n number of the UEs. The base station 702 may then configure D2D channel measurement periods for a group of the UEs, determine a number of subsets of the group of the UEs based on a pattern, and schedule each of the subsets for transmission of a signal (e.g., a reference signal, such as SRS) as previously described with respect to FIGS. 7 and 8.

FIG. 9 is a diagram 900 illustrating a frame structure of SRS subframe configurations in accordance with the various aspects of the present disclosure. As shown in FIG. 9, diagram 900 defines SRS subframe configurations and the subframes in which SRS signals may be transmitted.

FIG. 10 is a diagram 1000 illustrating UE specific SRS configurations in accordance with the various aspects of the present disclosure. As shown in FIG. 10, diagram 1000 defines values for the SRS configuration index $I_{SRS}$ and the corresponding periodicity $T_{SRS}$ and SRS subframe offset $T_{offset}$.

FIG. 11 is a diagram 1100 illustrating an SRS bandwidth configuration in accordance with the various aspects of the present disclosure. For example, as shown in FIG. 11, when the SRS bandwidth configuration $C_{SRS}$ is 0 and $B_{SRS}=0$, all 48 resource blocks of the UL bandwidth may be sounded at once, whereas when $C_{SRS}=0$ and $B_{SRS}=3$, only four resource blocks of the UL bandwidth may be sounded at a time.

Figure 12:
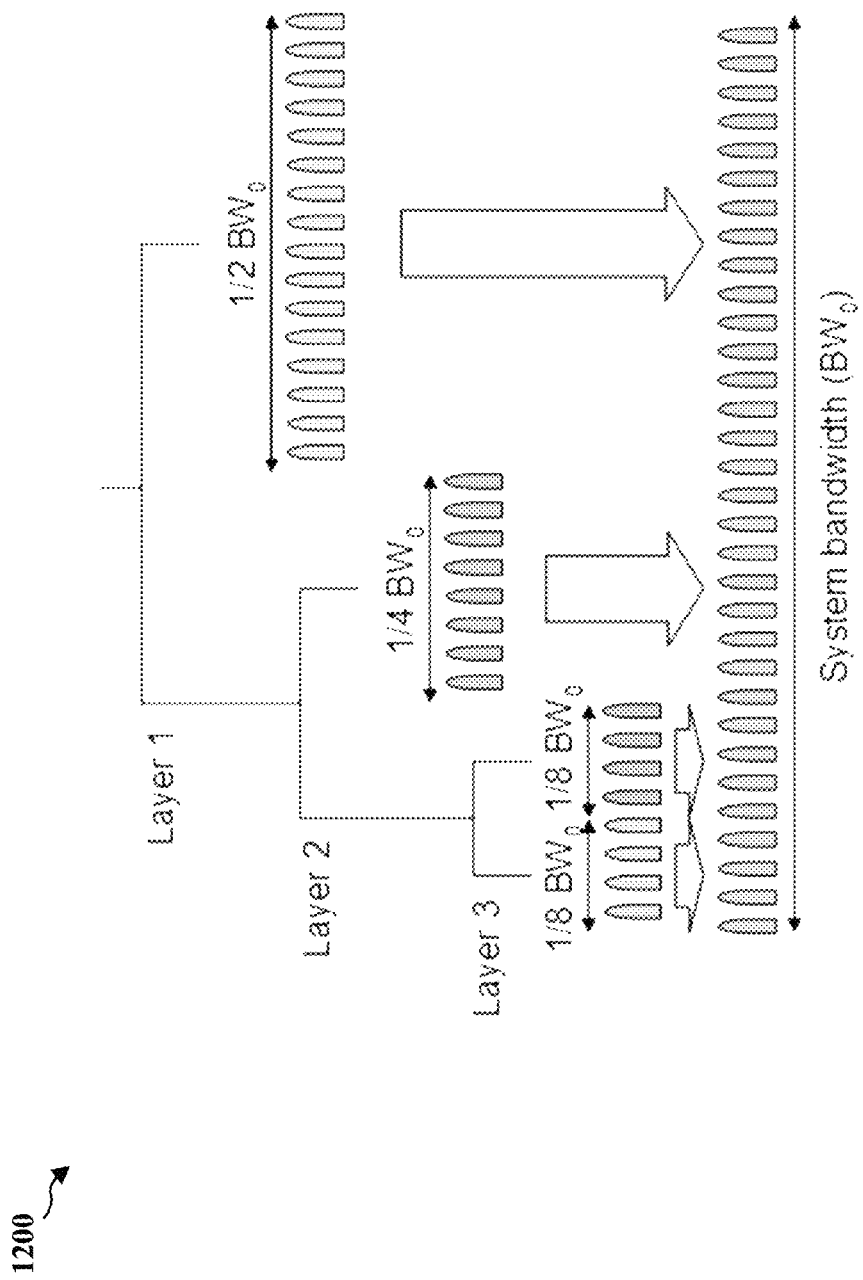
FIG. 12 is a diagram illustrating an allocation structure of SRS bandwidths in accordance with the various aspects of the present disclosure.

FIG. 12 is a diagram 1200 illustrating an allocation structure of SRS bandwidths in accordance with the various aspects of the present disclosure. For example, as shown in FIG. 12, combinations of portions of the system bandwidth $BW_0$ may be allocated by hierarchal levels 1 through 3 for transmission of SRSs.

Figure 13:
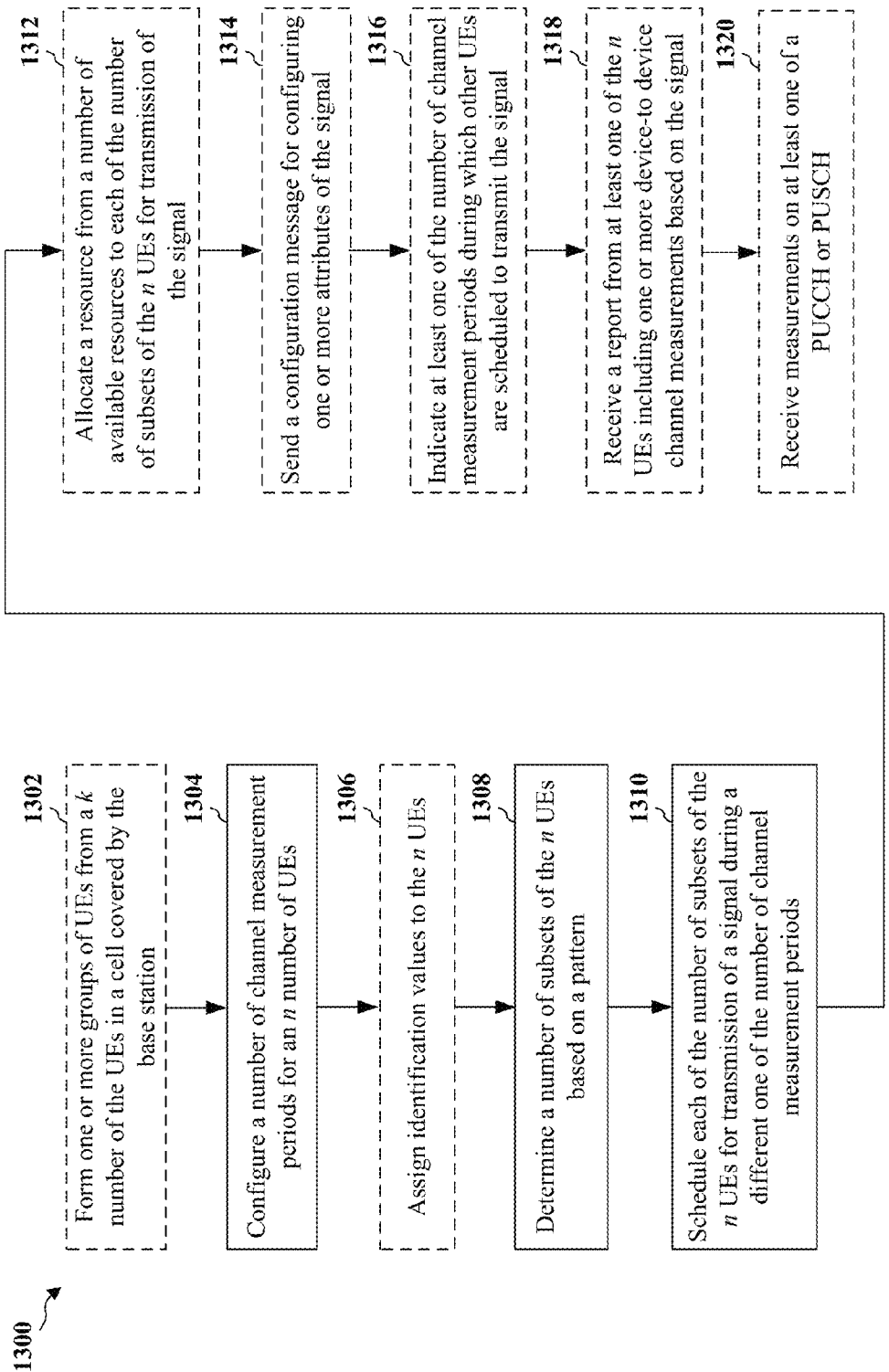
FIG. 13 is a flow chart of a method of wireless communication in accordance with the various aspects of the present disclosure.

FIG. 13 is a flow chart 1300 of a method of wireless communication in accordance with the various aspects of the present disclosure. The method may be performed by an eNB (e.g., base station 702 in FIG. 7). At step 1302, the eNB forms one or more groups of UEs from a k number of UEs in a cell covered by the eNB. In an aspect, each of the one or more groups of UEs may include an n number of UEs, where k>n. In an aspect, at least two of the n UEs may be D2D communication At step 1304, the eNB configures a number of channel measurement periods for the n number of UEs. In an aspect, at least one of the number of the channel measurement periods may be one or more symbols in a subframe. For example, the eNB may configure 2 [$\log_2$ n] channel measurement periods for the n number of UEs in the cell covered by the eNB. For example, in the configuration of FIG. 7 that includes four UEs (e.g., n=4), the base station 702 may configure four (e.g., 2 [$\log_2$ 4]=4) channel measurement periods, such as period 1 802, period 2 804, period 3 806, and period 4 808 shown in FIG. 8.

At step 1306, the eNB assigns identification values to the n UEs. For example, as shown in FIG. 8, UE 1 704 may be assigned a binary identification value '00', UE 2 706 may be assigned a binary identification value '01', UE 3 708 may be assigned a binary identification value '10', and UE 4 710 may be assigned a binary identification value '11'.

At step 1308, the eNB determines a number of subsets of the n UEs based on a pattern. In an aspect, each of the number of subsets of the n UEs includes less than or equal to n/2 UEs. In an aspect, the pattern indicates one or more of the n UEs to be included in each of the number of subsets based on the identification values. For example, a subset of the n UEs may be determined according to the values of specific bits in the binary identification values. For example, if the $j^{th}$ (e.g., j=1, 2, . . . , log 2n bit of a binary identification value of a UE is '0', such UE may be included in one subset, whereas if the $j^{th}$ bit of a binary identification value of a UE is '1', such UE may be included in another subset. In an aspect, the first bit (e.g., j=1) of a binary identification value may be the least significant bit of the binary identification value, the second bit (e.g., j=2) may be the bit next to the least significant bit of the binary identification value, and so on. With reference to FIG. 8, for example, UEs whose first bit (e.g., j=1) of the binary identification value is '0' include UE 1 and UE 3, UEs whose first bit (e.g., j=1) of the binary identification value is '1' include UE 2 and UE 4, UEs whose second bit (e.g., j=2) of the binary identification value is '0' include UE 1 and UE 2, and UEs whose second bit (e.g., j=2) of the binary identification value is '1' include UE 3 and UE 4. Accordingly, UE 1 and UE 3 may be included in a first subset, UE 2 and UE 4 may be included in a second subset, UE 1 and UE 2 may be included in a third subset, and UE 3 and UE 4 may be included in a fourth subset.

At step 1310, the eNB schedules each of the number of subsets of the n UEs for transmission of a signal during a different one of the number of channel measurement periods. For example, the eNB may schedule UEs whose $j^{th}$ bit of the binary identification value is '0' to transmit in D2D channel measurement period 2j−1, and may schedule UEs whose $j^{th}$ bit of the binary identification value is '1' to transmit in channel measurement period 2j. For example, with reference to FIG. 8, the eNB may schedule the first subset including UE 1 and UE 3 to transmit during period 1 802, the second subset including UE 2 and UE 4 to transmit during period 2 804, the third subset including UE 1 and UE 2 to transmit during period 3 806, and the fourth subset including UE 3 and UE 4 to transmit during period 4 808.

At step 1312, the eNB allocates a resource from a number of available resources to each of the number of subsets of the n UEs for transmission of the signal. In an aspect, the number of concurrently available resources is greater than or equal to n/2. For example, the number of available resources may be available SRS resources.

At step 1314, the eNB sends a configuration message for configuring one or more attributes of the signal. In an aspect, the attributes include a comb, a cyclic shift, and/or a transmit power.

At step 1316, the eNB indicates, to one or more of the n UEs in a cell covered by the eNB and/or one or more UEs outside the cell, at least one of the number of channel measurement periods during which other UEs are scheduled to transmit the signal.

At step 1318, the eNB receives a report from at least one of the n UEs. In an aspect, the report may include one or more D2D channel measurements based on the signal. In an aspect, the one or more channel measurements in the report are prioritized based on channel strength.

Finally, at step 1320, the eNB receives measurements on at least one of a PUCCH or a PUSCH.

Figure 14:
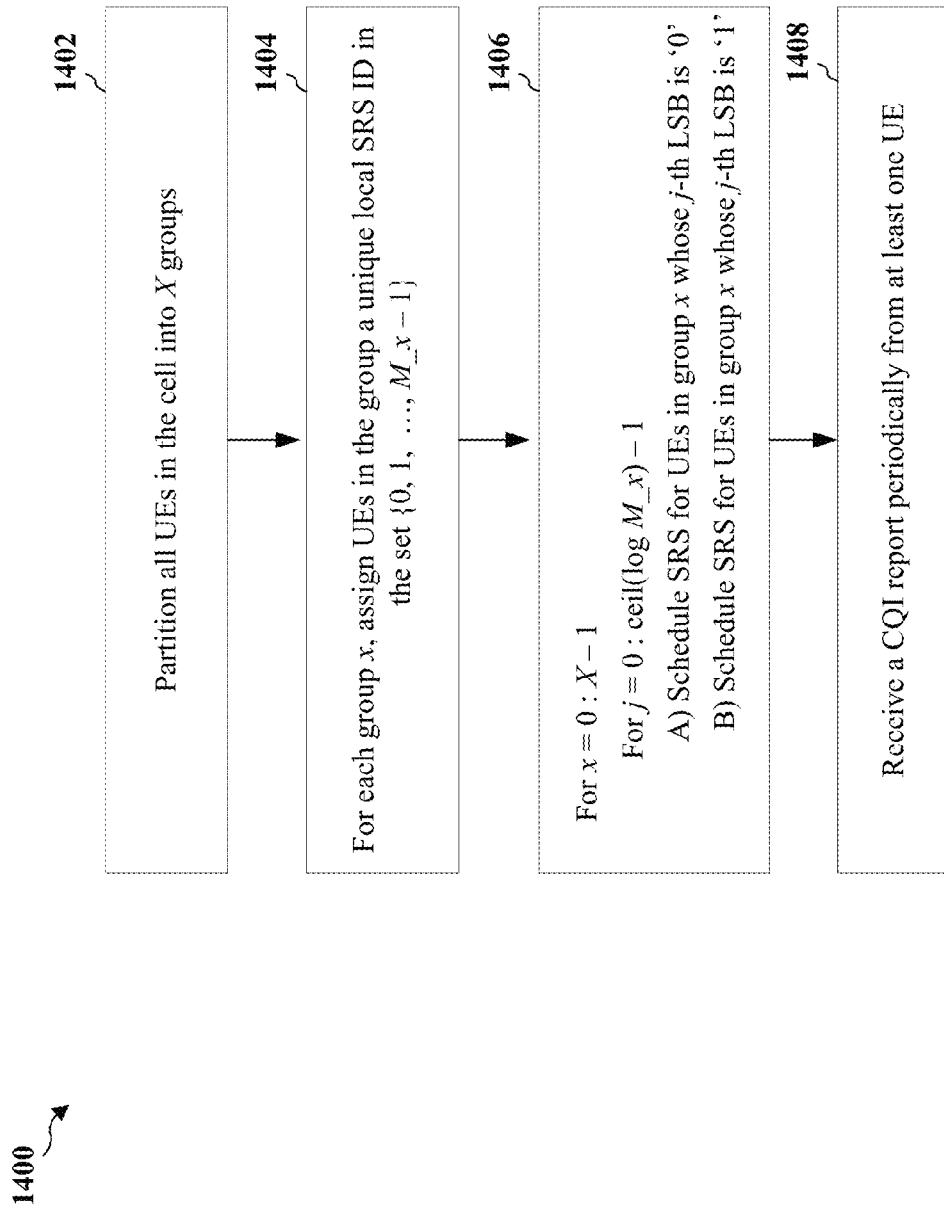
FIG. 14 is a flow chart of an SRS broadcast scheduling algorithm for D2D channel measurements in accordance with the various aspects of the present disclosure.

FIG. 14 is a flow chart 1400 of an SRS broadcast scheduling algorithm for D2D channel measurements in accordance with the various aspects of the present disclosure. The method may be performed by an eNB (e.g., base station 702 in FIG. 7). At step 1402, the eNB partitions all UEs in the cell served by the eNB into X groups. At step 1404, for each group x, the eNB assigns UEs in the group a unique local SRS ID in the set {0, 1, . . . , M_x−1}. At step 1406, for x=0: X−1, for j=0: ceil(log M_x)−1, the eNB schedules SRS for UEs in group x whose j-th LSB is '0' and the eNB schedules SRS for UEs in group x whose j-th LSB is '1'. At step 1408, the eNB receives a CQI report periodically from at least one UE.

Therefore, in the flow chart 1400, for any two UEs i and j: 1) If i and j are in different groups, done; 2) If i and j are in the same group x, the eNB denotes Dij as the number of different digits in i and j's local SRS ID, in which case j will hear i's SRS broadcast Dij times, and i will hear j's SRS broadcast Dij times. Moreover, the complexity of the algorithm in FIG. 14 (e.g., the number of symbol times) may be represented by the expression: 2 sum_x (ceil(log M_x)). In one example, where N is a large value, and where M_x=48 for all x, the number of symbol times=2ceil(N/48)ceil(log 48)=12ceil(N/48). In another example, where N=30 and M=30, the number of symbol times=2ceil(log 30)=10.

Therefore, the reference signal (e.g., SRS) broadcast scheduling scheme implemented by a base station for measuring D2D channels as described in accordance with the various aspects of the present disclosure may reduce the schedule length (e.g., reduce the number of D2D channel measurement periods) for UEs subject to a half duplex constraint. In an aspect, the reference signal broadcast scheduling scheme may provide flexibility in supporting different UE densities, different reference signal transmission bandwidths for each UE, and/or various frequency hopping patterns. Moreover, the reference signal broadcast scheduling scheme provides low computation complexity and allows the schedule to be computed using an efficient algorithm for a set-cover problem.

For example, the reference signal broadcast scheduling scheme may provide flexibility in supporting a diverse range of UE densities such that one group can support up to 48 UEs in each cell having a bandwidth of 50 resource blocks. The reference signal broadcast scheduling scheme may be adaptable for dense networks with more groups and may implement time division multiplexing (TDM) among groups, which may avoid half-duplex constraints.

For example, the reference signal broadcast scheduling scheme may provide flexibility in supporting reference signal transmission bandwidths by implementing an algorithm that specifies binary reference signal (e.g., SRS) broadcast schedules. Moreover, different reference signal bandwidth allocations may be possible within one group and different reference signal bandwidth configurations may be allowed across different groups.

For example, the reference signal broadcast scheduling scheme may provide flexibility in supporting frequency hopping by allowing different frequency hopping patterns within one group and being compatible with legacy WAN reference signal hopping schemes.

In an aspect, half of each group of UEs may broadcast a reference signal (e.g., an SRS) for each D2D channel measurement period and a large diversity gain may be achieved across groups. Diversity gain may vary among D2D pairs within one group.

Figure 15:
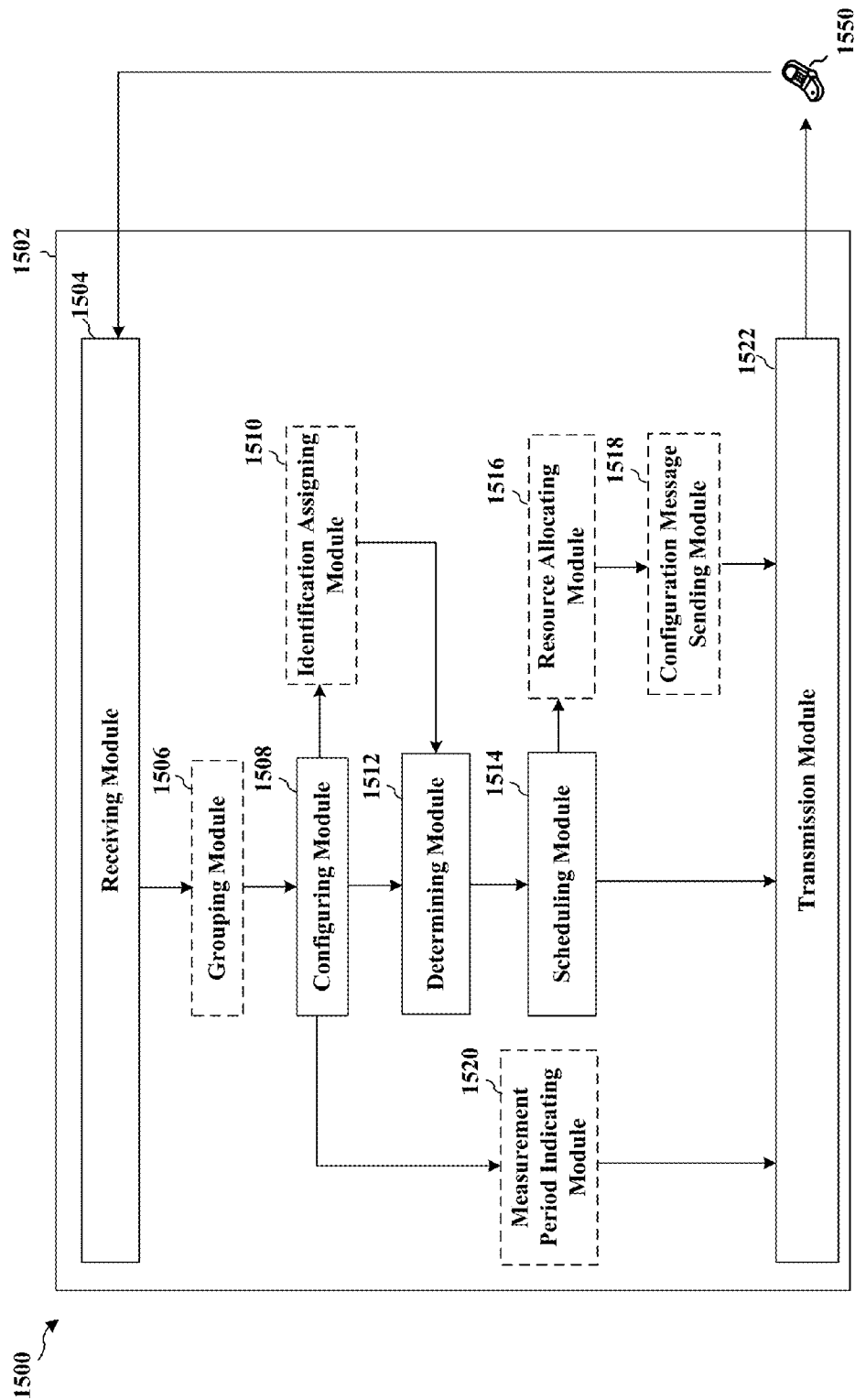
FIG. 15 is a conceptual data flow diagram illustrating the data flow between different modules/means/components in an exemplary apparatus.

FIG. 15 is a conceptual data flow diagram 1500 illustrating the data flow between different modules/means/components in an exemplary apparatus 1502. The apparatus may be an eNB (e.g., base station 702 in FIG. 7). The apparatus includes a module 1504 that receives a report (e.g., CQI) from at least one of n UEs (e.g., UE 1550) and receives measurements on at least one of a PUCCH or a PUSCH, a module 1506 that forms one or more groups of UEs from a k number of the UEs in a cell covered by the eNB, a module 1508 that configures a number of channel measurement periods for an n number of UEs, a module 1510 that assigns identification values to the n UEs, a module 1512 that determines a number of subsets of the n UEs based on a pattern, a module 1514 that schedules each of the number of subsets of the n UEs for transmission of a signal during a different one of the number of channel measurement periods, a module 1516 that allocates a resource from a number of available resources to each of the number of subsets of the n UEs for transmission of the signal, a module 1518 that sends a configuration message for configuring one or more attributes of the signal, a module 1520 that indicates, to one or more of the n UEs in a cell covered by the eNB and/or one or more UEs outside the cell, and a module 1522 for transmitting signals (e.g., DL signals) to one or more UEs (e.g., UE 1550).

The apparatus may include additional modules that perform each of the steps of the algorithm in the aforementioned flow charts of FIGS. 13 and 14. As such, each step in the aforementioned flow charts of FIGS. 13 and 14 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
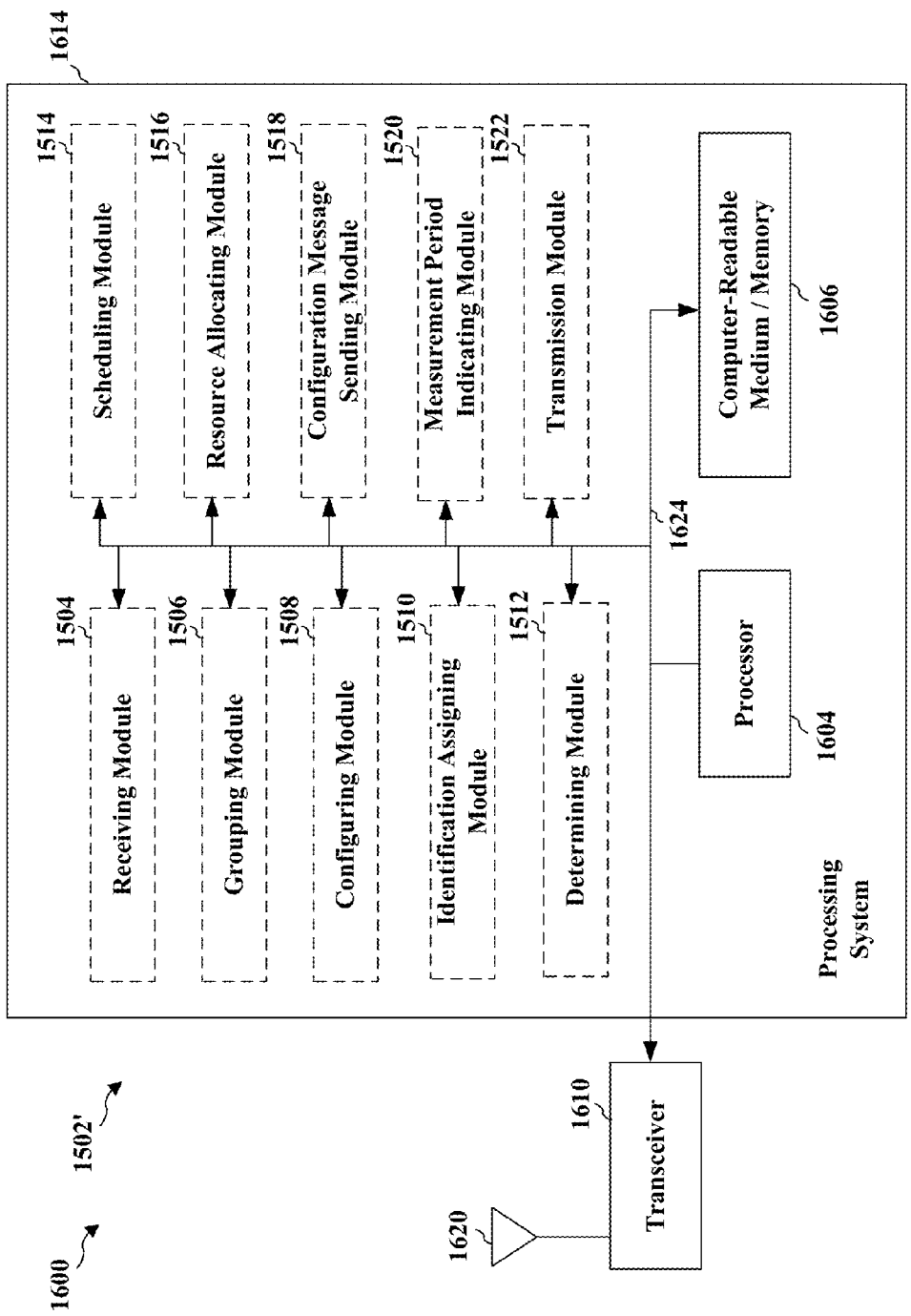
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1604, the modules 1504, 1506, 1508, 1510, 1512, 1514, 1516, 1518, 1520, and 1522, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the receiving module 1504. In addition, the transceiver 1610 receives information from the processing system 1614, specifically the transmission module 1522, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system further includes at least one of the modules 1504, 1506, 1508, 1510, 1512, 1514, 1516, 1518, 1520, and 1522. The modules may be software modules running in the processor 1604, resident/stored in the computer readable medium/memory 1606, one or more hardware modules coupled to the processor 1604, or some combination thereof. The processing system 1614 may be a component of the eNB 610 and may include the memory 676 and/or at least one of the TX processor 616, the RX processor 670, and the controller/processor 675.

In one configuration, the apparatus 1502/1502' for wireless communication includes means for forming one or more groups of UEs from a k number of the UEs in a cell covered by the base station, means for configuring a number of channel measurement periods for an n number of UEs, means for determining a number of subsets of the n UEs based on a pattern, means for scheduling each of the number of subsets of the n UEs for transmission of a signal during a different one of the number of channel measurement periods, means for assigning identification values to the n UEs, wherein the pattern indicates one or more of the n UEs to be included in each of the number of subsets based on the identification values, means for allocating a resource from a number of available resources to each of the number of subsets of the n UEs for transmission of the signal, wherein the number of concurrently available resources is greater than or equal to n/2, means for sending a configuration message for configuring one or more attributes of the signal, means for indicating, to one or more of the n UEs in a cell covered by the base station and/or one or more UEs outside the cell, means for receiving a report from at least one of the n UEs, and means for receiving measurements on at least one of a PUCCH or a PUSCH. The aforementioned means may be one or more of the aforementioned modules of the apparatus 1502 and/or the processing system 1614 of the apparatus 1502' configured to perform the functions recited by the aforementioned means. As described supra, the processing system 1614 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication for a base station, comprising:
    configuring a plurality of channel measurement periods for an n number of user equipments (UEs);
    assigning identification values to the n UEs;
    determining a plurality of subsets of the n UEs based on a pattern, each subset of the plurality of subsets including one or more UEs of the n UEs, wherein the pattern indicates the one or more UEs of the n UEs included in each subset based on the identification values, and wherein at any given time, each of the n UEs that has been assigned an identification value is simultaneously included in at least two different subsets with each subset of the at least two different subsets including a different set of UEs; and
    scheduling each of the plurality of subsets of the n UEs for transmission of a reference signal for device-to-device channel measurement during a different channel measurement period of the plurality of channel measurement periods.

2. The method of claim 1, further comprising indicating, to one or more of the n UEs in a cell covered by the base station or one or more UEs outside the cell, at least one of the plurality of channel measurement periods during which other UEs are scheduled to transmit the signal.

3. The method of claim 2, wherein the at least one of the plurality of channel measurement periods comprises one or more symbols in a subframe.

4. The method of claim 1, further comprising receiving a report from at least one of the n UEs, the report comprising one or more device-to device channel measurements based on the signal.

5. The method of claim 4, wherein the one or more channel measurements are prioritized based on channel strength.

6. The method of claim 1, wherein each of the plurality of subsets of the n UEs comprises less than or equal to n/2 UEs.

7. The method of claim 1, further comprising allocating a resource from a number of available resources to each of the plurality of subsets of the n UEs for transmission of the signal, wherein the number of concurrently available resources is greater than or equal to n/2.

8. The method of claim 1, wherein at least two of the n UEs are in device-to-device communication.

9. The method of claim 1, further comprising forming one or more groups of UEs from a k number of the UEs in a cell covered by the base station, wherein the n UEs is a group of the one or more groups, and wherein k>n.

10. The method of claim 1, further comprising sending a configuration message for configuring one or more attributes of the signal, the attributes comprising at least one of a comb, a cyclic shift, or a transmit power.

11. The method of claim 1, further comprising receiving measurements on at least one of a physical uplink control channel (PUCCH) or a physical uplink shared channel (PUSCH).

12. An apparatus for wireless communication, comprising:
    means for configuring a plurality of channel measurement periods for an n number of user equipments (UEs);
    means for assigning identification values to the n UEs;
    means for determining a plurality of subsets of the n UEs based on a pattern, each subset of the plurality of subsets including one or more UEs of the n UEs, wherein the pattern indicates the one or more UEs of the n UEs included in each subset based on the identification values, and wherein at any given time, each of the n UEs that has been assigned an identification value is simultaneously included in at least two different subsets with each subset of the at least two different subsets including a different set of UEs; and
    means for scheduling each of the plurality of subsets of the n UEs for transmission of a reference signal for device-to-device channel measurement during a different channel measurement period of the plurality of channel measurement periods.

13. The apparatus of claim 12, further comprising means for indicating, to one or more of the n UEs in a cell covered by the apparatus or one or more UEs outside the cell, at least one of the plurality of channel measurement periods during which other UEs are scheduled to transmit the signal.

14. The apparatus of claim 13, wherein the at least one of the plurality of channel measurement periods comprises one or more symbols in a subframe.

15. The apparatus of claim 12, further comprising means for receiving a report from at least one of the n UEs, the report comprising one or more device-to device channel measurements based on the signal.

16. The apparatus of claim 15, wherein the one or more channel measurements are prioritized based on channel strength.

17. The apparatus of claim 12, wherein each of the plurality of subsets of the n UEs comprises less than or equal to n/2 UEs.

18. The apparatus of claim 12, further comprising means for allocating a resource from a number of available resources to each of the plurality of subsets of the n UEs for transmission of the signal, wherein the number of concurrently available resources is greater than or equal to n/2.

19. The apparatus of claim 12, wherein at least two of the n UEs are in device-to-device communication.

20. The apparatus of claim 12, further comprising means for forming one or more groups of UEs from a k number of the UEs in a cell covered by the apparatus, wherein the n UEs is a group of the one or more groups, and wherein k>n.

21. The apparatus of claim 12, further comprising means for sending a configuration message for configuring one or more attributes of the signal, the attributes comprising at least one of a comb, a cyclic shift, or a transmit power.

22. The apparatus of claim 12, further comprising means for receiving measurements on at least one of a physical uplink control channel (PUCCH) or a physical uplink shared channel (PUSCH).

23. An apparatus for wireless communication, comprising:
  a memory; and
  at least one processor coupled to the memory and configured to:
    configure a plurality of channel measurement periods for an n number of user equipments (UEs);
    assign identification values to the n UEs;
    determine a plurality of subsets of the n UEs based on a pattern, each subset of the plurality of subsets including one or more UEs of the n UEs, wherein the pattern indicates the one or more UEs of the n UEs included in each subset based on the identification values, and wherein at any given time, each of the n UEs that has been assigned an identification value is simultaneously included in at least two different subsets with each subset of the at least two different subsets including a different set of UEs; and
    schedule each of the plurality of subsets of the n UEs for transmission of a reference signal for device-to-device channel measurement during a different channel measurement period of the plurality of channel measurement periods.

24. The apparatus of claim 23, wherein the at least one processor is further configured to allocate a resource from a number of available resources to each of the plurality of subsets of the n UEs for transmission of the signal, wherein the number of concurrently available resources is greater than or equal to n/2.

25. The apparatus of claim 23, wherein the at least one processor is further configured to form one or more groups of UEs from a k number of the UEs in a cell covered by the apparatus, wherein the n UEs is a group of the one or more groups, and wherein k>n.

26. The apparatus of claim 23, wherein the at least one processor is further configured to receive a report from at least one of the n UEs, the report comprising one or more device-to device channel measurements based on the signal.

27. A non-transitory computer readable medium storing computer executable code for wireless communication, comprising:
  code for configuring a plurality of channel measurement periods for an n number of user equipments (UEs);
  code for assigning identification values to the n UEs;
  code for determining a plurality of subsets of the n UEs based on a pattern, each subset of the plurality of subsets including one or more UEs of the n UEs, wherein the pattern indicates the one or more UEs of the n UEs included in each subset based on the identification values, and wherein at any given time, each of the n UEs that has been assigned an identification value is simultaneously included in at least two different subsets with each subset of the at least two different subsets including a different set of UEs; and
  code for scheduling each of the plurality of subsets of the n UEs for transmission of a reference signal for device-to-device channel measurement during a different channel measurement period of the plurality of channel measurement periods.

* * * * *